May 29, 1962 J. J. GENTUSA 3,036,788
LINE PICK-UP FOR A SPINNING REEL
Filed Oct. 22, 1959
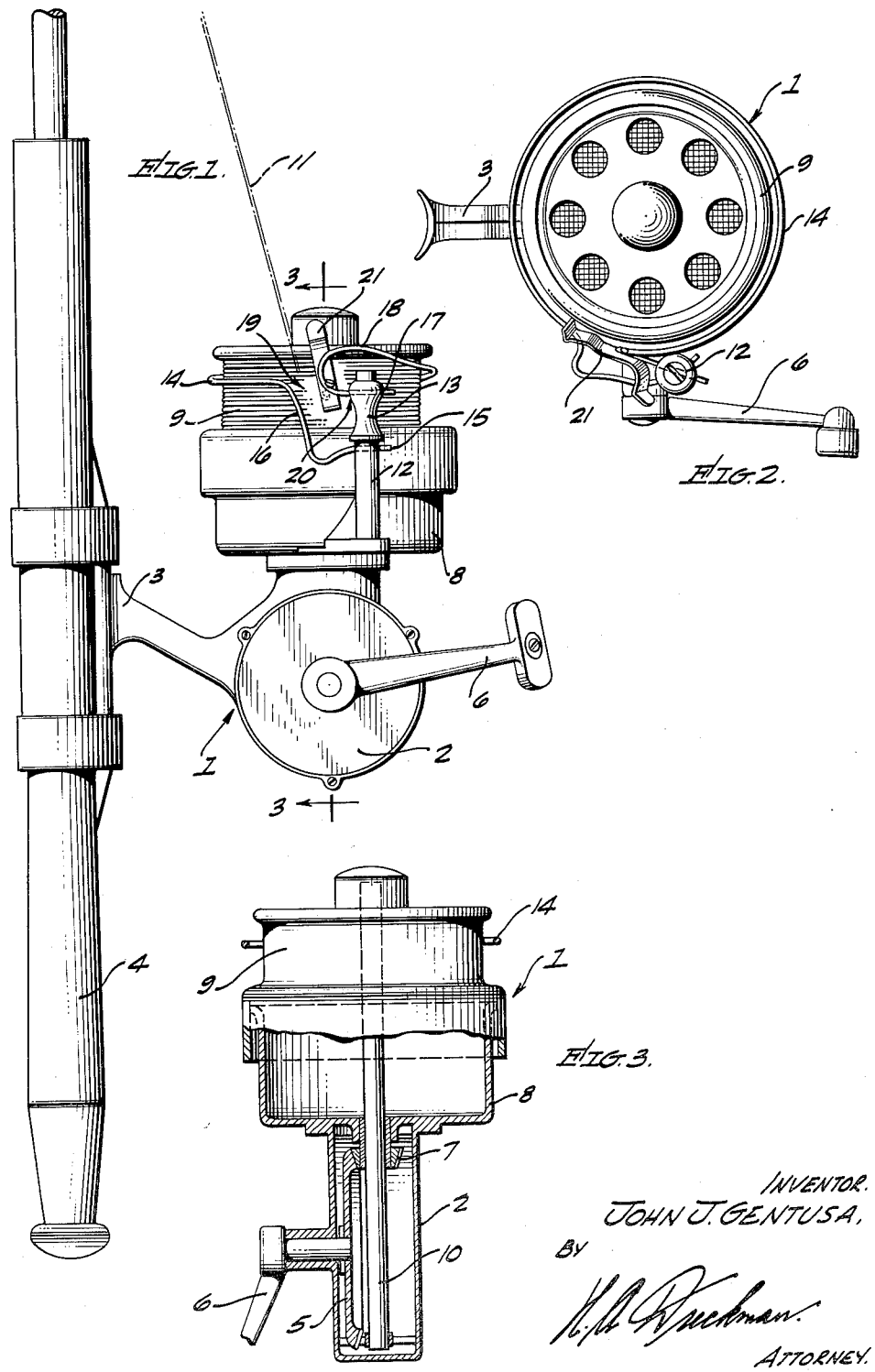
INVENTOR.
JOHN J. GENTUSA,
BY
ATTORNEY.

United States Patent Office 3,036,788
Patented May 29, 1962

3,036,788
LINE PICK-UP FOR A SPINNING REEL
John J. Gentusa, 1039 St. Louis, Long Beach 4, Calif.
Filed Oct. 22, 1959, Ser. No. 848,121
5 Claims. (Cl. 242—84.2)

This invention relates to a line pick-up for spinning reels, where the drum or bobbin is nonrotatably mounted. More particularly my invention relates to a novel pick-up device for the line which is employed in association with the rotating cup or flyer and is in the form of a wire loop. In fishing reels which have a nonrotary drum the line is rewound on the drum by a device known as a pick-up which is manually rotated and causes the line to wind or spool upon the stationary drum. When it is desired to rewind the line upon the spool or drum the line is manually positioned on the pick-up so that the pick-up finger or post holds the line in such a position that the rotating cup or flyer can cause the line to wind or spool upon the drum. The drum holds the line and a wire loop substantially surrounds the drum and is spaced from that drum so that the line is free to unreel from the drum in the casting operation without interference from the wire loop or bail which substantially surrounds the drum.

Another object of my invention is to provide a novel and simple guide means for the line which will direct that line into its post engaging and, therefore, its reeling position, this guide means being manually actuated as required by the fisherman.

Other objects, advantages and features of invention may appear from the accompanying drawing, the subjoined detailed description and the appended claims.

In the drawing:

FIGURE 1 is a side elevation of my spinning reel in position on a fishing pole.

FIGURE 2 is a top plan view of the fishing reel.

FIGURE 3 is a sectional view taken on line 3—3 of FIG. 1.

Referring more particularly to the drawing, my line pick-up is associated with a spinning reel 1 which includes a gear housing 2 including a mounting arm 3 which is attached to the handle 4 of the fishing rod in the usual and well known manner. The gear housing 2 incloses and journals a driving gear 5 which is rotated manually by the handle 6. The gear 5 meshes with a driving gear 7 attached to the cup or flyer 8 which is journaled in the housing 2. The flyer 8 is thus manually rotated by the fisherman when it is desired to rewind the fishing line upon the stationary spool or drum 9. The stationary drum 9 is mounted on a fixed post 10 which projects upwardly from the gear housing 2. The post 10 also acts as a journal and mounting means for the gear 7 and the cup or flyer 8.

When it is desired to rewind the fishing line 11 upon the drum 9 it is necessary that that line engage a pick-up which rotates with the flyer 8. In my pick-up construction a post 12 is fixedly attached to the outside of the cup or flyer 8 and, therefore, rotates with the ffyer. The upper end of this post is rounded to form a head 13. This rounded head provides a rest or shoulder against which the line 11 bears during the spooling or rewinding operation.

A bail 14, in the form of a wire ring, substantially encircles the spool 9. This bail is also spaced somewhat from the outer surface of the spool so that the line 11 can readily move between the spool and the circular bail 14. One end of the bail is attached to the post 12 as shown at 15. The wire is then curved upwardly as shown at 16 and is then formed in the substantially horizontal ring portion of the bail. The other end 17 of the bail is attached to the head 13 above the end 15 previously described. The wire bail curves, as shown at 18, providing a space 19 through which the line 11 can pass in order to engage the head 13 during the pick-up or rewinding operation of the reel. The loop 18 also forms a shoulder or rest 20 with the head 13 to insure that the line will remain in position against the head during the rewinding operation of the reel. The angle of the bail 14 relative to the head 13 is such that the fishing line will be held on the shoulder 20 during the rewinding operation. The fisherman manually moves the line through the space 19 and into the space 20 with a finger of either hand and then rotates the handle 6 to cause the post 12 to rotate around the stationary spool 9. Thus the line will be rewound on the spool and also will be properly guided in the casting operation, due to the fact that the circular part of the bail 14 will prevent snagging or uneven unspooling of the line.

A line stop finger 21 is pivotally mounted to the loop portion 18 of the bail 14 and can be manually swung so that the outer end thereof either engages the upper edge of the drum 9, or in another position engages the curved portion 16 to close the gap 19. When it is desired to move the line 11 into the space 20 the finger 21 is moved to the position shown in FIG. 1. In this position the gap 19 is open so that the line can be directed under the finger 21 and thence into the space 20 where the line is held against the head 13 to permit the rewinding or spooling operation of the reel. When it is desired to cast the line 11 the finger 21 is moved inwardly to the position shown in FIG. 2 where the outer end of the finger engages the bail 14, thus closing the gap 19 and permitting the line to freely unspool from the drum 9. In this latter position there is a 360° opening around the spool or drum 9, thus permitting the line to move freely within the circular bail 14.

Having described my invention, I claim:

1. A line pick-up for spinning reels having a nonrotary drum, a flyer coaxially mounted with the drum, means to manually rotate said flyer, a pick-up device comprising a wire loop substantially encircling said drum, a post fixedly mounted on the flyer, both ends of said wire loop being fixedly attached to the post, and said wire loop having a gap therein between the ends thereof, said post closing one side of the gap whereby the fishing line is directed through the gap to bear against said post, said loop being positioned entirely above the top edge of the flyer.

2. A line pick-up for spinning reels having a nonrotary drum, a flyer coaxially mounted with the drum, means to manually rotate said flyer, a pick-up device comprising a wire loop substantially encircling said drum, a post fixedly mounted on the flyer, both ends of said wire loop being fixedly attached to the post, and said wire loop having a gap therein between the ends thereof, said post closing one side of the gap whereby the fishing line is directed through the gap to bear against said post, and a line stop means pivotally mounted adjacent said gap, said line stop means being movable in one position to extend across the gap and in another position to open the gap.

3. A line pick-up for spinning reels having a nonrotary drum, a flyer coaxially mounted within the drum, means to manually rotate said flyer, a pick-up device comprising a wire loop substantially encircling said drum, a post fixedly mounted on the flyer, both ends of said wire loop being fixedly attached to the post, and said wire loop having a gap therein between the ends thereof, said post closing one side of the gap whereby the fishing line is directed through the gap to bear against said post, and a line stop means pivotally mounted adjacent said gap, said line stop means being movable in one position to extend across the gap and in another position to open the gap, said line stop means consisting of a finger, said finger being pivotally mounted on said wire loop.

4. In a fishing reel having a nonrotary drum, a flyer coaxial with the drum, manual means to rotate said flyer, a post fixedly mounted on the flyer, said post being positioned adjacent the periphery of said drum, a pick-up device comprising a wire bail substantially encircling said drum and spaced from the periphery of the drum, said loop being positioned entirely above the top edge of the flyer, both ends of said wire bail being fixedly attached to the post, the ends of said wire bail adjacent the post being spaced to provide a gap, the fishing line being movable through said gap to rest against the post during the pick-up operation of the fishing reel.

5. In a fishing reel having a nonrotary drum, a flyer coaxial with the drum, manual means to rotate said flyer, a post fixedly mounted on the flyer, said post being positioned adjacent the periphery of said drum, a pick-up device comprising a wire bail substantially encircling said drum and spaced from the periphery of the drum, both ends of said wire bail being fixedly attached to the post, the ends of said wire bail adjacent the post being spaced to provide a gap, the fishing line being movable through said gap to rest against the post during the pick-up operation of the fishing reel, a line stop finger, means pivotally mounting the line stop finger on said bail adjacent said gap, the line stop finger being movable in one position to close the gap and in another position to open said gap.

References Cited in the file of this patent

UNITED STATES PATENTS 2,879,954     Small _____ Mar. 31, 1959

FOREIGN PATENTS 804,067     France _____ July 27, 1936